United States Patent
Dodeja et al.

(10) Patent No.: US 9,104,409 B2
(45) Date of Patent: *Aug. 11, 2015

(54) PREDICT COMPUTING PLATFORM MEMORY POWER UTILIZATION

(75) Inventors: Rakesh Dodeja, Portland, OR (US); Neelam Chandwani, Portland, OR (US); Chetan Hiremath, Portland, OR (US); Udayan Mukherjee, Portland, OR (US); Anthony Ambrose, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1100 days.

This patent is subject to a terminal disclaimer.

(21) Appl. No.: 12/752,955

(22) Filed: Apr. 1, 2010

(65) Prior Publication Data

US 2010/0191997 A1    Jul. 29, 2010

Related U.S. Application Data

(63) Continuation of application No. 11/447,701, filed on Jun. 6, 2006, now Pat. No. 7,752,468.

(51) Int. Cl.
  *G06F 1/00* (2006.01)
  *G06F 1/32* (2006.01)

(52) U.S. Cl.
  CPC ............ *G06F 1/3203* (2013.01); *G06F 1/3225* (2013.01)

(58) Field of Classification Search
  None
  See application file for complete search history.

(56) References Cited

U.S. PATENT DOCUMENTS

| | | | |
|---|---|---|---|
| 4,866,712 A | | 9/1989 | Chao |
| 5,237,677 A | | 8/1993 | Hirosawa et al. |
| 5,293,323 A | | 3/1994 | Doskocil et al. |
| 5,404,543 A | * | 4/1995 | Faucher et al. ............... 713/323 |
| 5,500,940 A | | 3/1996 | Skeie |
| 5,596,712 A | | 1/1997 | Tsuyama et al. |
| 6,324,659 B1 | | 11/2001 | Pierro |
| 6,421,632 B1 | | 7/2002 | LeCorney |
| 6,473,659 B1 | | 10/2002 | Shah et al. |
| 6,510,393 B1 | | 1/2003 | Steinigke |
| 6,643,801 B1 | | 11/2003 | Jammu et al. |

(Continued)

FOREIGN PATENT DOCUMENTS

| | | |
|---|---|---|
| JP | 05-126872 A | 5/1993 |
| WO | WO 2005/114441 A2 | 12/2005 |

OTHER PUBLICATIONS

First Office Action for Chinese Patent Application No. 200610130963.9, date of issue Aug. 1, 2008, 14 pages.

(Continued)

*Primary Examiner* — Kim Huynh
*Assistant Examiner* — Vincent Chang
(74) *Attorney, Agent, or Firm* — Blakely, Sokoloff, Taylor & Zafman LLP

(57) ABSTRACT

A method to reduce memory power consumption for a computing platform includes inspecting an operating parameter associated with a resource of the computing platform that is updated by the resource of the computing platform during runtime of the computing platform. Memory power utilization is then predicted for the computing platform during the runtime of the computing platform based at least in part on the operating parameter. A current power state of at least one memory module resident on the computing platform is transitioned to one of a plurality of power states based on the predicting of the memory power utilization.

17 Claims, 6 Drawing Sheets

(56) References Cited

U.S. PATENT DOCUMENTS

| | | | |
|---|---|---|---|
| 6,651,190 | B1 | 11/2003 | Worley et al. |
| 6,947,797 | B2 | 9/2005 | Dean et al. |
| 7,035,989 | B1 | 4/2006 | Hinker et al. |
| 7,409,594 | B2 | 8/2008 | Mukherjee et al. |
| 7,412,369 | B1* | 8/2008 | Gupta ............................ 703/14 |
| 7,752,468 | B2 | 7/2010 | Dodeja et al. |
| 2001/0029592 | A1 | 10/2001 | Walker et al. |
| 2003/0061383 | A1 | 3/2003 | Zilka |
| 2003/0204758 | A1 | 10/2003 | Singh |
| 2003/0208706 | A1 | 11/2003 | Roddy et al. |
| 2004/0019815 | A1 | 1/2004 | Vyssotski et al. |
| 2004/0233074 | A1* | 11/2004 | Cornelius ....................... 341/50 |
| 2005/0246558 | A1* | 11/2005 | Ku ................................. 713/300 |
| 2006/0179334 | A1* | 8/2006 | Brittain et al. ................ 713/320 |
| 2007/0083701 | A1* | 4/2007 | Kapil ............................. 711/106 |
| 2007/0198872 | A1 | 8/2007 | Bailey et al. |

OTHER PUBLICATIONS

Second Office Action for Chinese Patent Application No. 200610130963.9, date of issue Feb. 27, 2009, 7 pages.

Third Office Action for Chinese Patent Application No. 200610130963.9, date of issue Jun. 26, 2009, 8 pages.

U.S. Office Communication, Restriction Requirement, mailed May 18, 2009, U.S. Appl. No. 11/447,701, filed Jun. 6, 2006, 13 pages.

U.S. Office Action mailed Sep. 8, 2009, U.S. Appl. No. 11/447,701, filed Jun. 6, 2006, 19 pages.

U.S. Office Action mailed Jan. 8, 2010, U.S. Appl. No. 11/447,701, filed Jun. 6, 2006, 13 pages.

U.S. Office Communication, Advisory Action, mailed Jan. 28, 2010, U.S. Appl. No. 11/447,701, filed Jun. 6, 2006, 2 pages.

U.S. Notice of Allowance mailed Feb. 24, 2010, U.S. Appl. No. 11/447,701, filed Jun. 6, 2006, 9 pages.

First Office Action issued Jan. 16, 2012, German Patent Application No. 112007001215.3-53, filed Jun. 6, 2006, 6 pages.

PCT/US2007/070052, PCT International Search Report and Written Opinion of the International Searching Authority, mailed Dec. 28, 2007, 10 pages.

D.C. Bossen, et al., "Fault-Tolerance Design of the IBM pSeries 690 System Using Power4 Processor Technology", IBM Journal of Research and Development, Jan. 2002, pp. 77-86, vol. 46, No. 1, International Business Machines Corporation, New York, NY.

Gonscherowski, P., "Sun Fire™ 6800/4810/4800/3800 Auto Diagnosis and Recovery Features", Sun Blueprints, Apr. 2003, pp. 3-8.

Second Office Action issued Jul. 20, 2012, German Patent Application No. 112007001215.3-53, filed Jun. 6, 2006, 6 pages.

* cited by examiner

Table
400

| Hook | Category | Operating Parameter |
|---|---|---|
| 320 | Network Traffic | data received, data forwarded, statistics |
| 330 | Processing Element Utilization | idle time, input/output time, system time, user time, number of processes |
| 330 | Processing Element Performance | cache misses, memory loads, memory stores |
| 330 | Processing Element Power State | power states |
| 330 | Processing Element Memory Allocation | physical pages allocated and de-allocated |
| 340 | Memory Access Pattern | reads, writes, number of commands pending, scrub, mirroring |
| 360 | Memory Module Power State | power states |

*Fig. 4*

PREDICT COMPUTING PLATFORM MEMORY POWER UTILIZATION

CROSS REFERENCE TO RELATED APPLICATIONS

This is a Continuation of U.S. application Ser. No. 11/447,701, filed Jun. 6, 2006.

This application is related to U.S. application Ser. No. 10/887,368, filed by Udayan Mukherjee and Aniruddha Kundu and entitled "On-line Diagnostic System and Method."

BACKGROUND

Power consumption and cooling constraints are typical challenges faced in a computing platform operating environment. These challenges are magnified in a typical telecommunication network or datacenter where a multitude of computing platforms (e.g., in a rack, cabinet, etc.) are deployed. Constant pressure is exerted on service providers and datacenter administrators to reduce the total cost of ownership for these deployments and yet increase performance. This may lead to a higher density of processing elements on a computing platform and/or on a rack level to improve performance. Minimizing power consumption is an important goal for service providers and datacenter administrators to hold down the cost of energy bills and total cost of ownership.

BRIEF DESCRIPTION OF THE DRAWINGS

FIG. 4 provides a table to depict example operating parameters to be monitored;

DETAILED DESCRIPTION

As mentioned in the background, minimizing power consumption is an important goal to hold down the total cost of ownership. While there has been a particular focus on reducing power utilized by processing elements (e.g., central processing units (CPUs)), current and proposed memory technologies are becoming significant sources of power consumption. This presents a challenge in designing a high performance computing platform and holding down the total cost of ownership.

In one example, one or more statistical prediction models are implemented to predict memory power utilization and reduce power consumption for a computing platform. This implementation includes determining a configuration parameter for the computing platform, monitoring an operating parameter for the computing platform and predicting memory power utilization for the computing platform. The prediction is to be based on the determined configuration parameter and the monitored operating parameter. One or more memory modules resident on the computing platform are transitioned to one of a plurality of power states based at least in part on memory power utilization predicted via the implementation of the one or more statistical prediction models.

Figure 1:
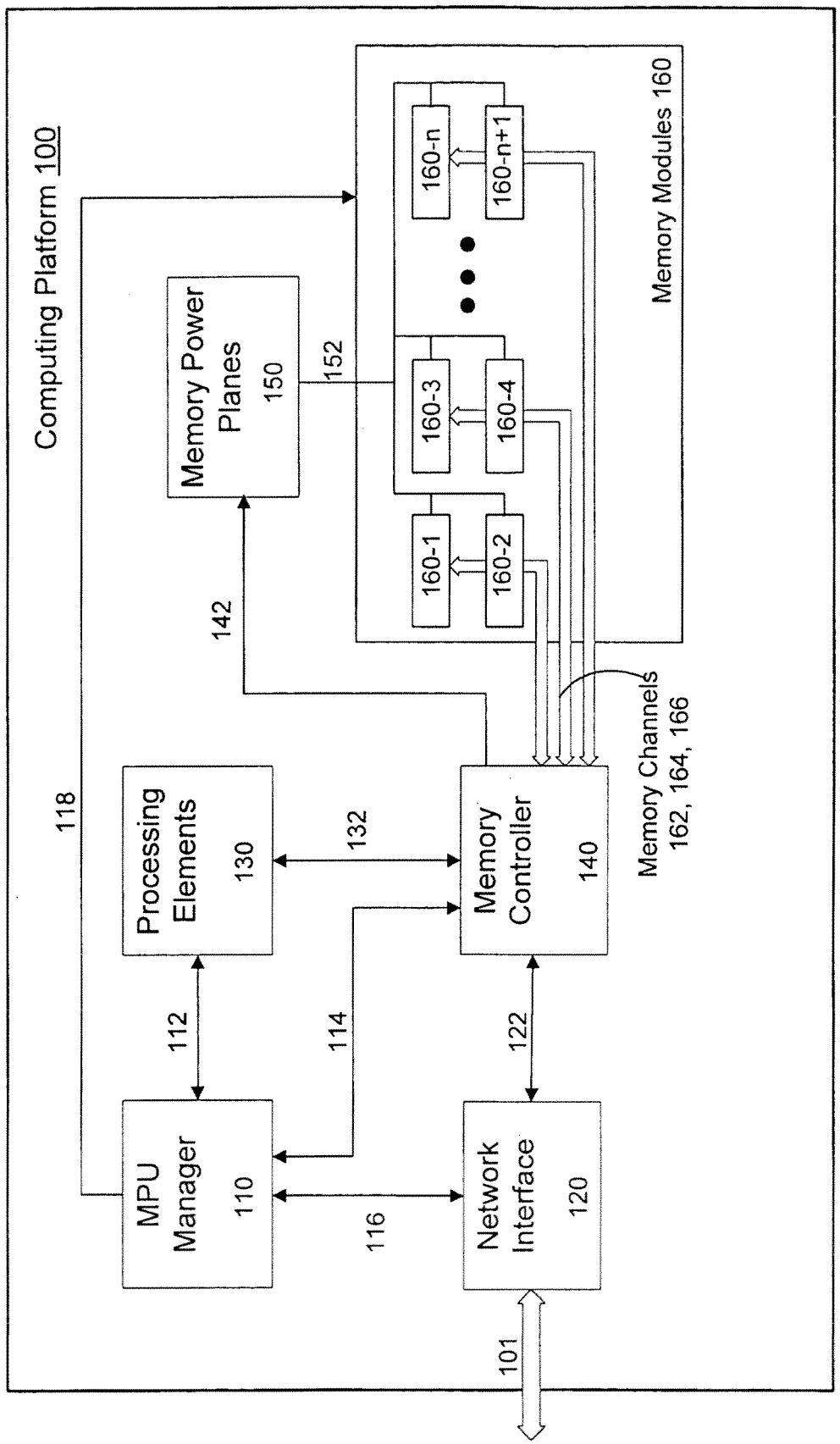
FIG. 1 is an illustration of elements of an example computing platform.

FIG. 1 is an illustration of elements of an example computing platform 100. In one example, as depicted in FIG. 1, computing platform 100 includes memory power utilization (MPU) manager 110, network interface 120, processing elements 130, memory controller 140, memory power planes 150 and memory modules 160. Although not shown in FIG. 1, computing platform 100 may also include other hardware, software, firmware or a combination of these elements and be a part of a computing device. This computing device may be a single blade computer in a chassis and/or rack, a server, a desktop computer, a laptop computer, a notebook computer, a digital broadband telephony device, a digital home network device (e.g., cable/satellite/set top box, etc.), a personal digital assistant (PDA), System on Chip (SOC) and the like.

In one example, as described more below, MPU manager 110 determines configuration parameters for computing platform 100 and monitors operating parameters to predict memory power utilization. Elements on computing platform 100 (e.g., MPU manager 110, memory controller 140) may cause memory power planes 150 to transition one or more memory modules from one power state to another power state (see FIG. 5).

In one example, MPU manager 110 is coupled to other elements of computing platform 100 via one or more communication links. These communication links, for example, are depicted in FIG. 1 as communication links 112, 114, 116 and 118. As described more below, MPU manager 110, for example, includes an appropriate interface to these other elements to determine configuration parameters, monitor operating parameters and cause memory modules to transition to another power state.

In one example, network interface 120 includes the interface via which computing platform 100 is coupled to a network via network link 101, e.g., a wired or a wireless local area network (LAN/WLAN), a wide area network (WAN/WWAN), a metropolitan area network (MAN), a personal area network (PAN) and a cellular or a wireless broadband telephony network. Network interface 120, for example, includes hardware, software or firmware to transmit and receive data to this network. This may include one or more network interface cards, fabric interface cards or other elements to receive and transmit data via network link 101. In one example, communication link 122 may be used by network interface 120 elements to make memory read/write requests to memory controller 140. These requests may send/retrieve data to/from memory modules 160. Although not shown in FIG. 1, MPU manager 110, for example, may also couple to communication link 101 and directly monitor network bandwidth.

In one example, processing elements 130 include the software, hardware, and/or firmware to support one more processing operations on computing platform 100. This may include software such as operating systems and/or applications, hardware such as microprocessors, network processors, service processors, microcontrollers, field programmable gate arrays (FPGAs), application specific integrated circuit (ASICs) and firmware to include executable code to initiate basic input/output systems (BIOS) and/or initiate computing platform 100 elements for virtualization operations. In one example, communication link 132 may be used by processing elements 130 to make memory read/write requests to memory controller 140.

In one example, memory controller 140 handles/completes requests for data to be stored (written) and retrieved (read) into one or more memory modules of memory modules 160.

For example, these requests may be received via communication links 122 or 132. In one implementation, memory controller 140 may use memory power planes 150 to transition these one or more memory modules into various power states based on predicted memory power utilization that is determined, for example, by MPU manager 110.

In one example, memory controller 140 may be integrated with processing element 130. For example, memory controller 140 may serve as an integrated memory controller for a microprocessor. In this example, MPU manager 110 may communicate with memory controller 140 through an interface coupled to processing elements 130 (e.g., via communication link 112) or through an interface coupled directly to an integrated memory controller 140 (e.g., via communication link 132).

In one implementation, memory power planes 150 provide power to memory modules 160 via power feeds 152. Power feeds 152 as shown in FIG. 1, for example, are routed to each memory module from among memory modules 160. Power feeds 152 may provide power in various different voltage (v) levels, e.g., 0.9v, 1.5v, 1.8v, 3.3v, 5v, etc. These voltage levels, for example, are regulated to provide power within a range of voltages.

In one example, memory modules 160 include a plurality of memory modules. These memory modules are depicted in FIG. 1 as 160-1 through 160-n+1, with n representing any positive integer. In one implementation, pairs of these memory modules couple to memory controller 140 through at least one memory channel (e.g., including data transmit and data receive communication links). An example of this coupling is depicted in FIG. 1 and includes memory channels 162, 164 and 166. This disclosure is not limited to only a pair of modules per channel but may include any number of memory modules per channel and may also include any number of memory channels. Data to be written to or read from each pair of memory modules is routed through these memory channels, for example, via point-to-point serial communication links. As described more below, these memory modules may consist of various types of memory that can be placed into various power states or levels based on predicted memory power utilization for computing platform 100.

Figure 2:
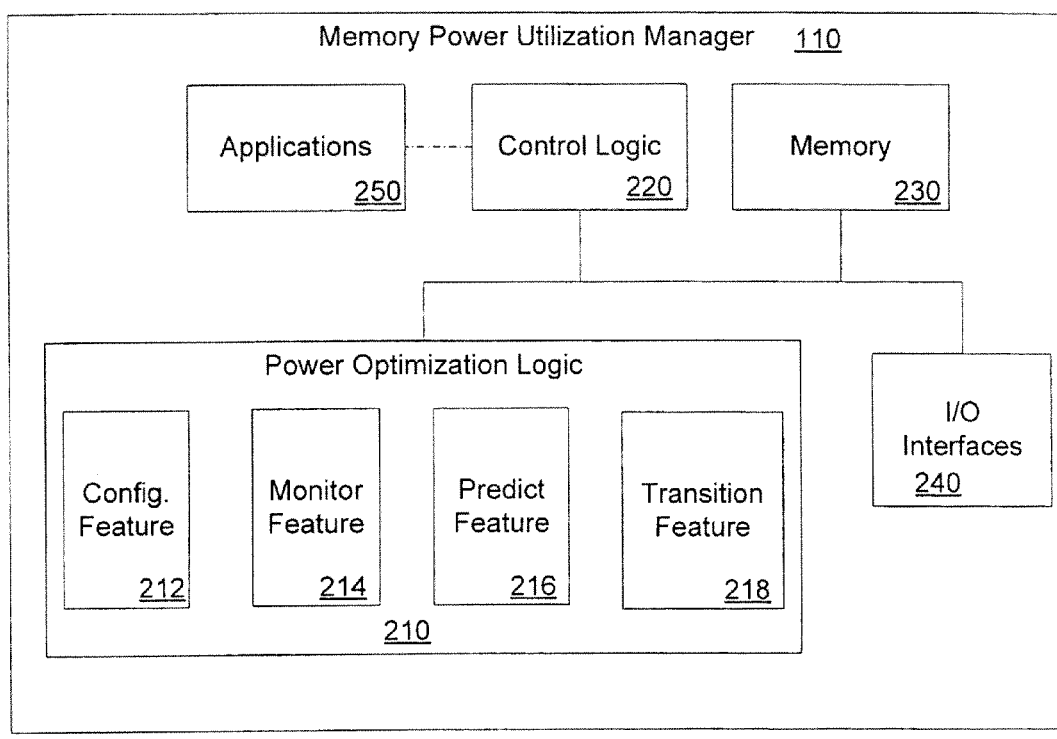
FIG. 2 provides a block diagram of an example memory power utilization (MPU) manager architecture.

FIG. 2 provides a block diagram of an example MPU manager 110 architecture. In FIG. 2, MPU manager 110's example architecture includes power optimization logic 210, control logic 220, memory 230, input/output (I/O) interfaces 240 and optionally one or more applications 250.

In one example, the elements portrayed in FIG. 2's block diagram are those elements to support or enable MPU manager 110 as described in this disclosure, although a given MPU manager may include some, all or more elements than those depicted in FIG. 2. For example, power optimization logic 210 and control logic 220 may each or collectively represent a wide variety of logic device(s) or executable content to implement the features of MPU manager 110. These logic device(s) may include a microprocessor, network processor, service processor, microcontroller, FPGA, ASIC, sequestered thread or core of a multi-core/multi-threaded microprocessor, special operating mode of a processor (e.g., system management mode) or combination thereof.

In FIG. 2, power optimization logic 210 includes configuration feature 212, monitor feature 214, predict feature 216 and transition feature 218. In one implementation, power optimization logic 210 uses these features to perform several operations. These operations include, for example, determining a configuration parameter, monitoring an operating parameter and predicting memory power utilization for computing platform 100 based on the determined configuration parameter and the monitored operating parameter. These operations may also include causing one or more memory modules to transition to various power states based at least in part on the predicted memory power utilization for computing platform 100.

Control logic 220 may control the overall operation of MPU manager 110 and as mentioned above, may represent any of a wide variety of logic device(s) or executable content to implement the control of MPU manager 110. In alternate examples, the features and functionality of control logic 220 are implemented within power optimization logic 210.

According to one example, memory 230 stores executable content. The executable content may be used by control logic 220 and/or power optimization logic 210 to implement or activate features or elements of MPU manager 110. Memory 230 may also temporarily maintain configuration and operating parameters obtained by power optimization logic 210's features to predict memory power utilization for computing platform 100.

I/O interfaces 240 may provide an interface via a communication medium or link between MPU manager 110 and elements resident on computing platform 100. As mentioned above for FIG. 1, MPU manager 110 may couple to these elements via communication links 112, 114, 116 and 118. I/O interfaces 240, for example, include interfaces that operate according to various communication protocols to communicate over these communication links. For example, I/O interfaces 240 operate according to a communication protocol that is described in a specification such as the System Management Bus (SMBus) Specification, version 2.0, published August 2000, and/or later versions. As described in more detail below, elements of computing platform 100 may provide information in memory registers or memory tables that are referred to in this disclosure as "hooks." Features of power optimization logic 210 may use I/O interface 240 to access these hooks via communication links 112, 114, 116 and 118.

I/O interfaces 240 may also provide an interface to elements located remotely to computing platform 100. As a result, I/O interfaces 240 may enable power optimization logic 210 or control logic 220 to receive a series of instructions from these elements. The series of instructions may enable power optimization logic 210 and/or control logic 220 to implement one or more features of MPU manager 110.

In one example, MPU manager 110 includes one or more applications 250 to provide internal instructions to control logic 220 and/or power optimization logic 210.

Figure 3:
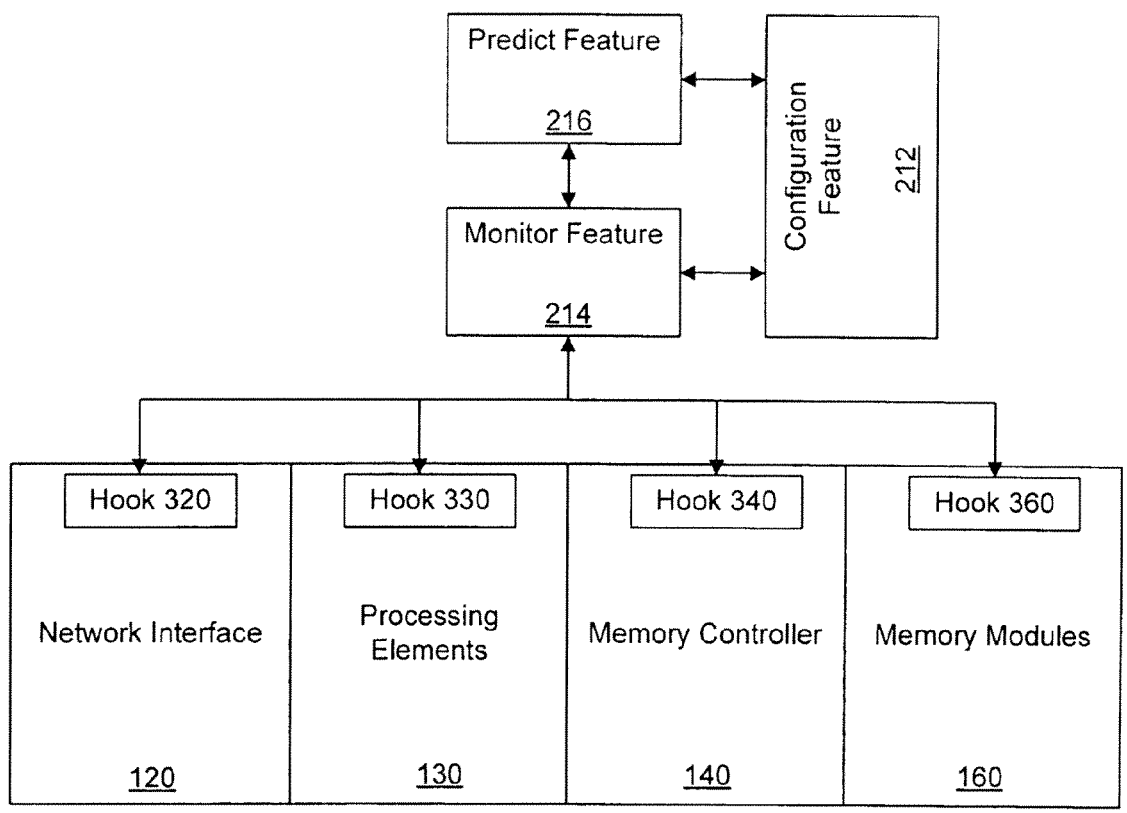
FIG. 3 is an illustration of elements of the MPU manager to implement an example statistical prediction module.

FIG. 3 is an illustration of elements of MPU manager 110 to implement an example statistical prediction module 300. In one example, the elements of MPU manager 110 are features of power optimization logic 210. As depicted in FIG. 3, these features include configuration feature 212, monitor feature 214 and predict feature 216.

In one implementation, configuration feature 212, monitor feature 214 and predict feature 216 are part of a statistical prediction or heuristics module activated by power optimization logic 210. In one example, configuration feature 212 obtains configuration parameters associated with elements resident on computing platform 100. These configuration parameters include, for example, the resources present on computing platform 100 (e.g., processing elements, network interfaces, memory, software, firmware, etc.) and the configuration of those resources. For example, memory modules 160 are used in various configurations that may impact memory power utilization in different ways. These usage configurations, for example, are obtained from memory controller 140 and include, but are not limited to, memory interleaving, memory mirroring, memory sparing and rank order allocation. Configuration parameters may also include information for monitor feature 214 to determine what operating parameters are to be monitored and how to obtain them.

In one example, configuration feature 212 obtains information that monitor feature 214 uses to obtain operating parameters placed in hooks associated with or maintained by elements of computing platform 100. In one example, these hooks are maintained in memory tables or memory registers and are depicted in FIG. 3 as hooks 320, 330 340 and 360 for network interface 120, processing elements 130, memory controller 140 and memory power planes 150, respectively.

As shown in FIG. 4, table 400 lists examples of categories and operating parameters associated with hooks 320, 330, 340 and 350. In one example, at least a portion of the contents of table 400 are obtained by configuration feature 212 (e.g., during power-up of computing platform 100) and made accessible to monitor feature 214 (e.g., temporarily stored in memory 230). Monitor feature 214 may then monitor operating parameters for computing platform 100 by accessing memory registers or memory tables associated with the hooks (e.g., via communication links 112, 114, 116 or 118). In one example, configuration feature 212 and monitor feature 214 provide configuration and operating parameters to predict feature 216. Predict feature 216, for example, implements various statistical prediction models including the use of statistical parameters in prediction algorithms that are based on computing platform 100's configuration and operating parameters to predict memory power utilization for computing platform 100.

In one example, transition feature 218 may receive predictions of memory power utilization for computing platform 100 from predict feature 216. Transition feature 218, for example, triggers or causes transition of one or more memory modules in memory modules 160 to other power states based on the predictions received from predict feature 216.

In one example, as shown in FIG. 4, hook 320 includes a network traffic category. Hook 320 for example includes information associated with the amount and/or rate of data received and forwarded through network interface 120. This may also include network traffic statistics (e.g., usage patterns, throughput, congestion, types of data traffic, etc.) for data (e.g., packet-based) that is received from and forwarded to a network coupled to computing platform 100 through network interface 120.

Hook 330, for example, contains several categories of information associated with processing element utilization, performance, power states and memory allocation. For example, the processing element may include a microprocessor and its utilization may be based on idle times, input/out times, system times, user times or number of processes running on the microprocessor. The microprocessor's performance may be based on cache misses, memory loads and store requests and the microprocessor's power state may also be a monitored operating parameter maintained in hook 330. In one example, the microprocessor's power state includes suspend, standby and deep sleep (e.g., microprocessor is halted and no instructions are being executed).

The processing element may also include an operating system and the operating system's memory management. In one example, this may include physical page allocations that are maintained in hook 330. De-allocations, for example, may be another operating parameter maintained in hook 330.

Hook 340, for example, contains memory access pattern information. This may include the number of reads and writes that memory controller 140 services or completes for computing platform 100 during a given time period. This may also include the number of commands pending and the number of scrubs that memory controller 140 performs in the given time period. The amount of mirroring (e.g., redundant memory read/write requests) that memory controller 140 handles/completes may also be included as an operating parameter maintained in hook 340.

Hook 350, for example, contains memory module power state information. This may include the power levels being provided to memory modules 160 by memory power planes 150.

Additional hooks may also be maintained by various other elements of computing platform 100. Thus, this disclosure is not limited to only the operating parameters associated with hooks 320, 330, 340 and 350, as described above.

In one example, as mentioned above, predict feature 216 uses statistical parameters in one or more prediction algorithms. These statistical parameters, in one implementation, can be learned or determined starting or beginning at the time computing platform 100 is initially powered-up. Learned or determined statistical parameters may also be tuned automatically or periodically during computing platform 100's runtime. In one example, the statistical parameters can also be learned for a given period of time (e.g., a training period) or configured for one or more types of computing platform 100 resources and/or utilization parameters.

In one implementation, statistical parameters allows predict feature 216 to anticipate the need to transition memory modules 160 to different power states to meet memory utilization needs. This anticipation, for example, may reduce possible memory latencies or reduction in data throughputs for computing platform 100 as one or more memory modules 160 are transitioned to these different power states. Power budget limits based on a power budge profile for computing platform 100, for example, also may influence memory utilization needs. As a result, predict feature 216 may anticipate transition needs to meet a given power budget profile for computing platform 100. These statistical parameters used by predict feature 216 may include, but are not limited to, memory requests made to a memory controller, processing element utilizations, network bandwidth and power budget profile.

In one example, network traffic information obtained from hook 320 can go into a statistical parameter to anticipate network bandwidth. Memory utilization, for example, varies based on network bandwidth as computing platform 100 may use memory modules 160 to at least temporarily store information to be received from or transmitted to a network. Thus, a statistical parameter used to predict memory utilization may be adjusted based on the network traffic information obtained from hook 320 at start-up, periodically or over a given period of time.

In one implementation, memory access patterns for computing platform 100 are obtained from hook 340 during an initial training period or while running applications. This may result in learned statistical parameters that indicate peak, busy traffic times or off-peak or low memory traffic times for computing platform 100. These busy or low traffic times may be based on time of day, day of year and holidays taking into account various traffic models associated with the applications. The busy or low traffic times may also be based on a sliding time window or a standard probabilistic distribution function with mean and variance parameters. The appropriate busy or low traffic pattern is determined during the training period and can also be imported in the statistical model via determined configuration parameters. These busy or low traffic times may be used in a prediction algorithm (for single or multiple memory modules 160) as shown in table 1 below:

TABLE 1

```
If (current_time == busy_traffic_time)
    Monitor operating parameters to confirm busy traffic time.
    If (memory_access_pattern == busy_traffic)
        Power State unchanged.
    Else if (memory access pattern == low traffic or no traffic)
        Adjust statistical parameters to learn this instance of low
traffic time;
        Power State unchanged.
Else if (current_time == low_traffic_time or idle_time)
    Determine appropriate low power state of memory module
based on idle window and probability of remaining idle or in low
traffic time for some duration based on learned statistical
parameters;
        Transition memory module into low power state;
        Start the end duration timer for transitioning memory out of
low power state based on expected duration of low or idle traffic
time;
        Continue monitoring the operating parameters (memory
capacity utilization, CPU utilization, network traffic, memory
access pattern) to proactively transition memory module back into
active state before it's required.
```

In another implementation, network traffic information obtained from hook 320 and memory access patterns obtained from hook 340 result in learned statistical parameters that indicate busy or low traffic times may be used along with learned statistical parameters resulting from information obtained from hook 330. These statistical parameters resulting from information obtained from hook 330 may indicate peak memory utilization for processing elements 130 (e.g., CPU memory utilizations). In one example, computing platform 100's configuration parameters include the memory capacity of memory modules 160 and this memory capacity may be compared to peak memory utilization and busy or low traffic times in an example prediction algorithm as shown in table 2 below. The busy or low traffic times may be based on rules described above (e.g., time of day, day of year, holidays, sliding time window, probabilistic distribution function).

TABLE 2

```
If (current_time == busy_traffic_time)
    Monitor operating parameters or hooks (330) to confirm
busy traffic time;
        If (memory_capacity_utilization == peak_memory)
            Power State unchanged.
        Else if (memory_capacity_utilization == low_traffic or
no_traffic)
            Adjust statistical parameters to learn this instance of
low traffic time;
                Power State unchanged.
    Else if (current_time == low_traffic_time or idle_time)
        Determine appropriate low power state of memory module
based on idle window and probability of remaining idle or in low
traffic time for some duration based on learned statistical
parameters;
            Transition memory module into low power state;
            Start the end duration timer for transitioning memory out of
low power state based on expected duration of low or idle traffic;
            Continue monitoring the operating parameters (e.g.
memory capacity utilization, CPU utilization , network bandwidth)
to proactively transition memory module back into active state
before it's required.
```

In another implementation, a power budget profile for computing platform 100 along with power consumed by computing platform 100 is used to determine a need to limit power consumed by computing platform 100 by transitioning memory modules 160 into lower power states. In this implementation, information in hooks 330 and 340 are obtained to gather or monitor operating parameters for power consumed by computing platform 100. For example, CPU utilization obtained from hook 330 and memory bandwidth obtained from hook 340 may relate to power consumed on computing platform 100. The power budge profile may be compared to this power consumption in an example prediction algorithm as shown in table 3 below.

TABLE 3

```
If (power_consumed > power_budget_profile);
    If (CPU_utilization > peak_CPU_utilization)
        Check the memory utilization (330, 340);
        If (low_memory_traffic)
            Transition memory modules into low power
state to reduce power consumed;
                Or
            Throttle memory bandwidth to reduce power
consumed;
        Continue monitoring power consumed;
    Else if (CPU_utilization == low_traffic)
        Transition CPU to different power state to reduce
power consumed.
```

Figure 5:
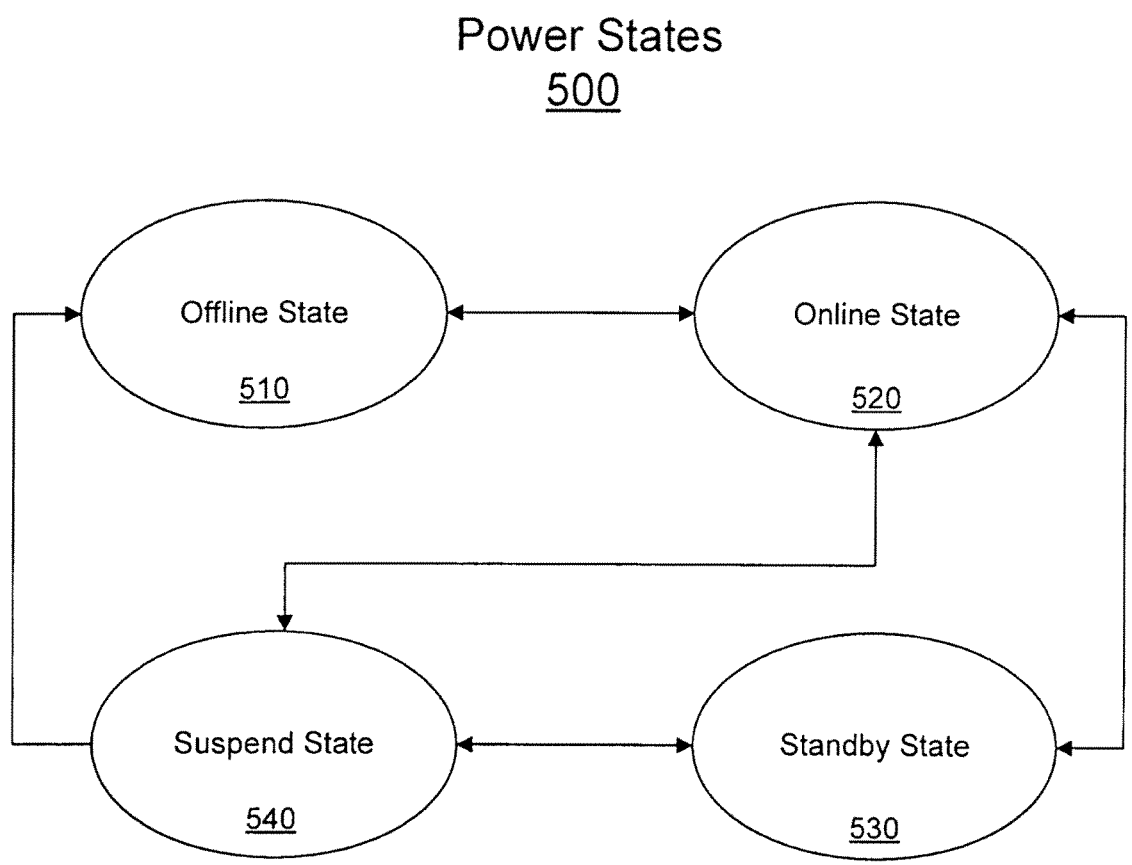
FIG. 5 is an illustration of example memory power states.

FIG. 5 is an illustration of example memory power states 500 that transition feature 218 may transition one or more memory modules from among memory modules 160. As shown in FIG. 5, memory power states 500 include offline state 510, online state 520, standby state 530 and suspend state 540.

In one implementation, memory modules of memory modules 160 may be dual inline memory modules (DIMMs). In this implementation, a DIMM includes a buffer (not shown) to temporarily hold data written to or read to the DIMM. The DIMM including the buffer, for example, is referred to as a fully buffered DIMM or FB-DIMM. An FB-DIMM, for example, may operate as described in a proposed FB-DIMM standard by the JEDEC Solid State Technical Association. According to the proposed FB-DIMM standard, the buffer part of an FB-DIMM is referred to as an advanced memory buffer (AMB).

In one example, an FB-DIMM AMB couples to memory controller 140 via a memory channel. In one configuration, for example, 2 FB-DIMMS couple to memory controller 140 via a single memory channel. For example, AMB's for memory modules 160-1 and 160-2 couple via memory channel 162, AMB's for memory modules 160-3 and 160-4 couple via memory channel 164 and AMB's for memory modules 160-n and 160-n+1 couple via communication channel 166 (see FIG. 1). In this configuration, for example, data to be written to or read to a DIMM is first routed to the AMB and then forwarded to its destination (e.g., memory controller 140 or a DIMM).

According to one example, for an FB-DIMM, offline state 510 represents a power state where the AMB and the DIMM are powered off. Online state 520, for example, is when the DIMM and the AMB are fully powered. Standby state 530, for example, is when the DIMM is in a lower power mode as compared to being fully powered (e.g., in a power-down mode) and the interface on the AMB that couples the DIMM to memory manager 140 is turned off (e.g., transmit and receive communication links disabled for a short, fixed duration of time or for an extended, variable duration of time). Suspend state 540 may represent a power state where the AMB is powered off and the DIMM is in a self-refresh mode.

In one implementation, as portrayed in FIG. 5, an FB-DIMM can be transitioned from offline state 510 to online state 520. In an online state 520, for example, the FB-DIMM can be transitioned into either suspend state 540 or standby state 530. From standby state 530 or suspend state 540, the FB-DIMM may transition to online state 520. Also, if in Standby state 530, the FB-DIMM may transition to suspend state 540. Finally, if in suspend state 540, the FB-DIMM may transition to offline state 510 or to standby state 530. This disclosure is not limited to only these types of memory power state transitions and is also not limited to only FB-DIMM memory types. Other types of memory may include, but are not limited to, generations of double data rate (DDR) static dynamic random access memory such as DDR (first generation), DDR2 (second generation) or DDR3 (third generation). Other types of memory may also include future generations of FB-DIMM or other memory technologies.

Figure 6:
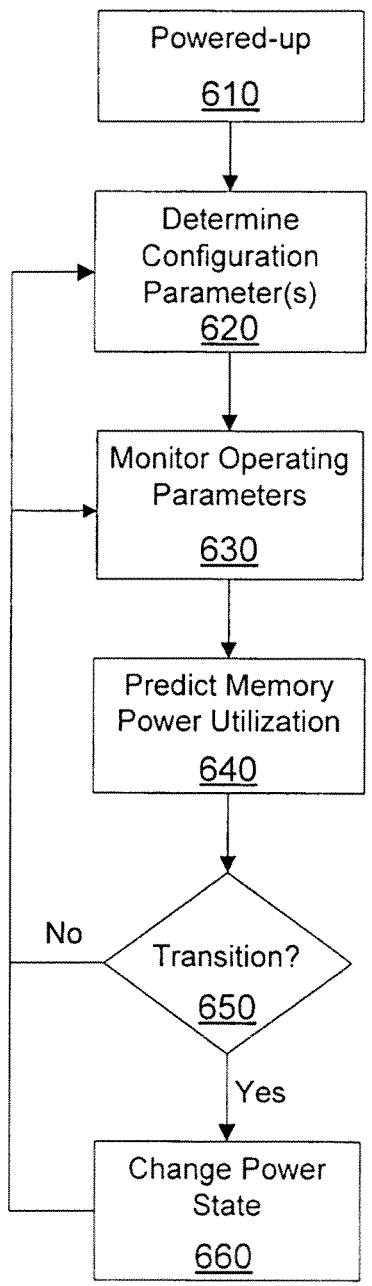
FIG. 6 is a flow chart of an example method to predict memory power utilization and transition a memory module to another power state based on the prediction.

FIG. 6 is a flow chart of an example method to predict memory power utilization and transition a memory module to another power state based on the prediction. In one example, computing platform 100, as depicted in FIG. 1, is used to describe this method. In block 610, for example, computing platform 100 is powered-on or powered-up. This power-up may occur as power is initially provided to computing platform 100, or incident to a reset of computing platform 100.

In block 620, in one example, upon power-up of computing platform 100, power optimization logic 210 in MPU manager 110 activates configuration feature 212. Configuration feature 212, in one example, obtains one or more configuration parameters associated with elements resident on computing platform 100. These configuration parameters may include the resources and the configuration of those resources for computing platform 100. Configuration feature 212, in one example, compiles at least a portion of these configuration parameters into a table and temporarily stores that table in a memory (e.g., memory 230). Configuration feature 212 may also compile a table similar to table 400 to indicate the hooks via which operating parameters can be monitored. This table, for example, is at least temporarily stored in a memory (e.g., memory 230).

In block 630, in one example, power optimization logic 210 activates monitor feature 214. Monitor feature 214, in one implementation, obtains or accesses the tables temporarily stored by configuration feature 212. Monitor feature 214, for example, uses the hooks described in the table similar to table 400 to facilitate the monitoring of computing platform 100's operation parameters. For example, monitor feature 214 uses hooks 320, 330 340 and 360 to obtain operating parameters associated with network interface 120, processing elements 130, memory controller 140 and memory modules 160, respectively.

In block 640, in one example, power optimization logic 210 activates predict feature 216. Predict feature 216, in one example, gathers configuration parameters and operating parameters obtained by configuration feature 212 and monitor feature 214. As mentioned above, predict feature 216 implements various statistical prediction models around computing platform 100's configuration and operating parameters to predict memory power utilization for computing platform 100.

In one implementation, predict feature 216's implementation of various statistical prediction models that include the configuration and operating parameters allows predict feature 216 to predict changes in memory utilization by various computing platform 100 elements. For example, memory in a given memory module of memory module 160 is either being allocated heavily or not at all by one or more entities of processing elements 130 (e.g., operating systems and/or applications). This may be indicated when monitor feature 214 periodically obtains hook 330 from processing elements 130. Based at least in part on the information in hook 330 and computing platform 100's configuration parameters and learned or trained statistical parameters, predict feature 216 may be able to predict the utilization of the given memory module and its power may be changed accordingly to reduce memory latencies or to meet a given power budget profile for computing platform 100.

In addition to usage patterns, in one example, predict feature 216 may also account for various configuration parameters for memory modules 160 such as memory interleaving, memory mirroring, memory sparing and rank order allocation. This accounting may allow predict feature 216 to determine the prediction that may least impact the performance of computing platform 100 elements (e.g., processing elements 130) when a given memory module or modules is transitioned to another power state.

In one implementation, memory modules 160-1-160-$n$+1 are FB-DIMMs as described above for FIG. 5. In one example, memory modules 160-1-160-$n$+1 have a configuration of 2 DIMMs per communication channel per branch, although this disclosure is not limited to this type of memory module configuration. If, for example, BIOS has enabled a branch sequential and rank interleaving 4:1 configuration, the ranks in a given branch participate in the branch memory region and even lower order memory address accesses go to the DIMMs on a given branch. Hence, predict feature 216 may account for this interleaving and consider a set of four DIMMs as a single memory resource group which can potentially be transitioned into the same power state (e.g., from among power states 500). Similarly, predict feature 216 may account for other types of memory interleaving configurations and may also account for power and performance friendly memory configurations for end user applications implemented on computing platform 100.

In block 650, in one example, power optimization logic 210 activates transition feature 218. Transition feature 218, in one example, receives a prediction from predict feature 216 that a given memory module or modules of memory modules 160 will not be utilized based on its implementation of at least one statistical prediction model. For example, the given memory module is memory module 160-1. Thus, for example, transition feature 218 causes memory module 160-1 to transition into another power state to save power for computing platform 100. This other power state may be one of the power states 500 depicted in FIG. 5. For example, if module 160-1 was in online state 520, transition feature 218 may cause memory module 160-1 to transition to offline state 510, standby state 530 or suspend state 540.

In one example, after module 160-1 is transitioned into another power state, successive predictions by predict feature 216 based on configuration and operating parameters may absorb possible reactivation/latency penalties that could degrade the performance of computing platform 100. Thus, the process may return to block 620 and/or 630 to predict the use of memory module 160-1 and then cause module 160-1 to be transitioned to another power state based on that predicted use or usage pattern.

Referring again to MPU manager 110 in FIG. 1. MPU manager 110, for example, is depicted as an element of computing platform 100 that is separate from Network interface 120, processing elements 130 and memory controller 140. In this example, MPU manager 110 may be part of or hosted on a dedicated management microcontroller such as a service processor.

In another example, MPU manager 110 resides within a grouping of computing platform 100 resources that includes memory controller 140 (e.g., a chipset). MPU manager 110, in this other example, may be part of a dedicated management microcontroller within the chipset or may be included within or hosted on memory controller 140. MPU manager 110, for example, obtains configuration and operating parameters through the various communication links coupled to memory controller 140.

In yet another example, MPU manager 110 is part of a virtual partition of computing platform 100. This may be a service operating system running on a dedicated sequestered core or portion of a core that operates using virtualization technology/virtual machine monitor (VT/VMM) support in processing elements 130. MPU manager 110, for example, may use various communication links coupled to processing elements 130 and/or to the virtual partition where MPU manager 110 exists or is executing to obtain configuration and operating parameters.

Referring again to memory 230 in FIG. 2. Memory 230 may include a wide variety of memory media including but not limited to volatile memory, non-volatile memory, flash, programmable variables or states, random access memory (RAM), read-only memory (ROM), flash, or other static or dynamic storage media.

In one example, machine-readable instructions can be provided to memory 230 from a form of machine-accessible medium. A machine-accessible medium may represent any mechanism that provides (i.e., stores and/or transmits) information or content in a form readable by a machine (e.g., an ASIC, special function controller or processor, FPGA, or other hardware device). For example, a machine-accessible medium may include: ROM; RAM; magnetic disk storage media; optical storage media; flash memory devices; electrical, optical, acoustical or other form of propagated signals (e.g., carrier waves, infrared signals, digital signals); and the like.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

References made in this disclosure to the term "responsive to" are not limited to responsiveness to only a particular feature and/or structure. A feature may also be "responsive to" another feature and/or structure and also be located within that feature and/or structure. Additionally, the term "responsive to" may also be synonymous with other terms such as "communicatively coupled to" or "operatively coupled to," although the term is not limited in his regard.

What is claimed is:

1. A method to reduce memory power consumption for a computing platform, the method comprising:
   during runtime of the computing platform, inspecting an operating parameter associated with a resource of the computing platform that is updated by the resource of the computing platform during the runtime of the computing platform;
   predicting a change from a current level of memory power utilization by the computing platform to another level of memory power utilization by the computing platform during the runtime of the computing platform, the predicting including evaluating, based on the inspecting the operating parameter, a statistical parameter of a statistical prediction algorithm, wherein the operating parameter includes a network traffic parameter, a processing element memory allocation parameter or a memory access pattern parameter; and
   transitioning a current power state of at least one memory module resident on the computing platform to one of a plurality of power states based on the predicting of the change from the current level of memory power utilization.

2. The method of claim 1, wherein inspecting the operating parameter comprises monitoring a memory location storing the operating parameter, wherein the memory location includes at least one of a register, a table in memory, or a buffer.

3. The method of claim 1, wherein the resource comprises at least one of a processing element, a network interface, or a memory controller.

4. The method of claim 1, wherein the statistical prediction algorithm is determined during a given period of time that begins as the computing platform is initially powered-up.

5. The method of claim 1, wherein the statistical prediction algorithm is determined during a given period of time and tuned periodically during the runtime of the computing platform.

6. The method of claim 5, wherein the statistical parameter includes at least one of memory requests made to a memory controller for the at least one memory module, memory capacity utilization for a processing element on the computing platform and network bandwidth on at least one communication link between the computing platform and a network.

7. The method of claim 1, further comprising:
   obtaining a configuration parameter from a memory controller for the at least one memory module, the configuration parameter to include at least one usage configuration for the at least one memory module selected from the following group of: memory interleaving, memory mirroring, memory sparing and rank order allocation.

8. The method of claim 1, wherein the plurality of power states includes an offline state, an online state, a standby state, or a suspend state.

9. The method of claim 1, wherein the at least one memory module is a fully buffered dual inline memory module (FB-DIMM).

10. The method of claim 9, wherein transitioning the FB-DIMM to one of the plurality of power states results in another FB-DIMM resident on the computing platform also transitioning to the same power state.

11. A non-transitory machine-accessible storage medium storing content, which, when executed by a machine resident on a computing platform causes the machine to perform:
   monitoring an operating parameter associated with a resource of the computing platform during runtime of the computing platform by inspecting a memory location that is updated by the resource of the computing platform during runtime of the computing platform;
   predicting a change from a current level of memory power utilization by the computing platform to another level of memory power utilization by the computing platform during the runtime of the computing platform, the predicting including evaluating, based on the inspecting the operating parameter, a statistical parameter of a statistical prediction algorithm, wherein the operating parameter includes a network traffic parameter, a processing element memory allocation parameter or a memory access pattern parameter; and
   transitioning a current power state of at least one memory module resident on the computing platform to one of a plurality of power states based on the predicting of the change from the current level of memory power utilization.

12. The non-transitory machine-accessible storage medium of claim 11, wherein the memory location comprises at least one of a register, a table in memory, or a buffer.

13. The non-transitory machine-accessible storage medium of claim 11, wherein the resource comprises at least one of a processing element, a network interface, or a memory controller.

14. The non-transitory machine-accessible storage medium of claim 11, wherein the statistical prediction algorithm is determined during a given period of time that begins as the computing platform is initially powered-up.

15. The non-transitory machine-accessible storage medium of claim 11, wherein the statistical prediction algorithm is determined during a given period of time and tuned periodically during the runtime of the computing platform.

16. The non-transitory machine-accessible storage medium of claim 15, wherein the statistical parameter includes at least one of memory requests made to a memory controller for the at least one memory module, memory capacity utilization for a processing element on the computing platform and network bandwidth on at least one communication link between the computing platform and a network.

17. The non-transitory machine-accessible storage medium of claim 11, wherein the plurality of power states includes an offline state, an online state, a standby state, and a suspend state.

\* \* \* \* \*